Oct. 25, 1960
P. V. CHOATE ET AL
2,957,337
HYDRODYNAMIC TESTING APPARATUS
Filed March 3, 1958
8 Sheets-Sheet 2
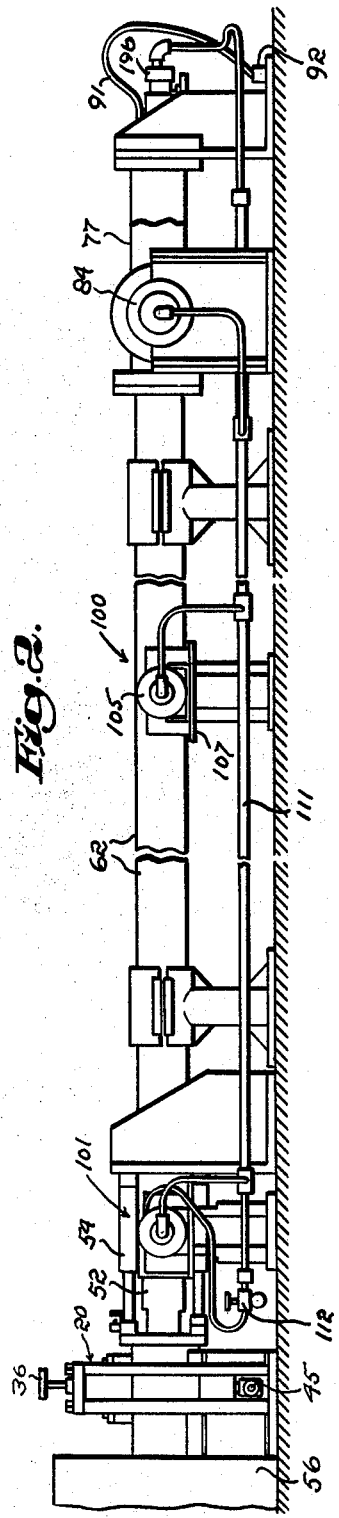
Inventors:
Paul V. Choate
Hans W. Aschaffenburg
by
Elliot Spear, Attorney

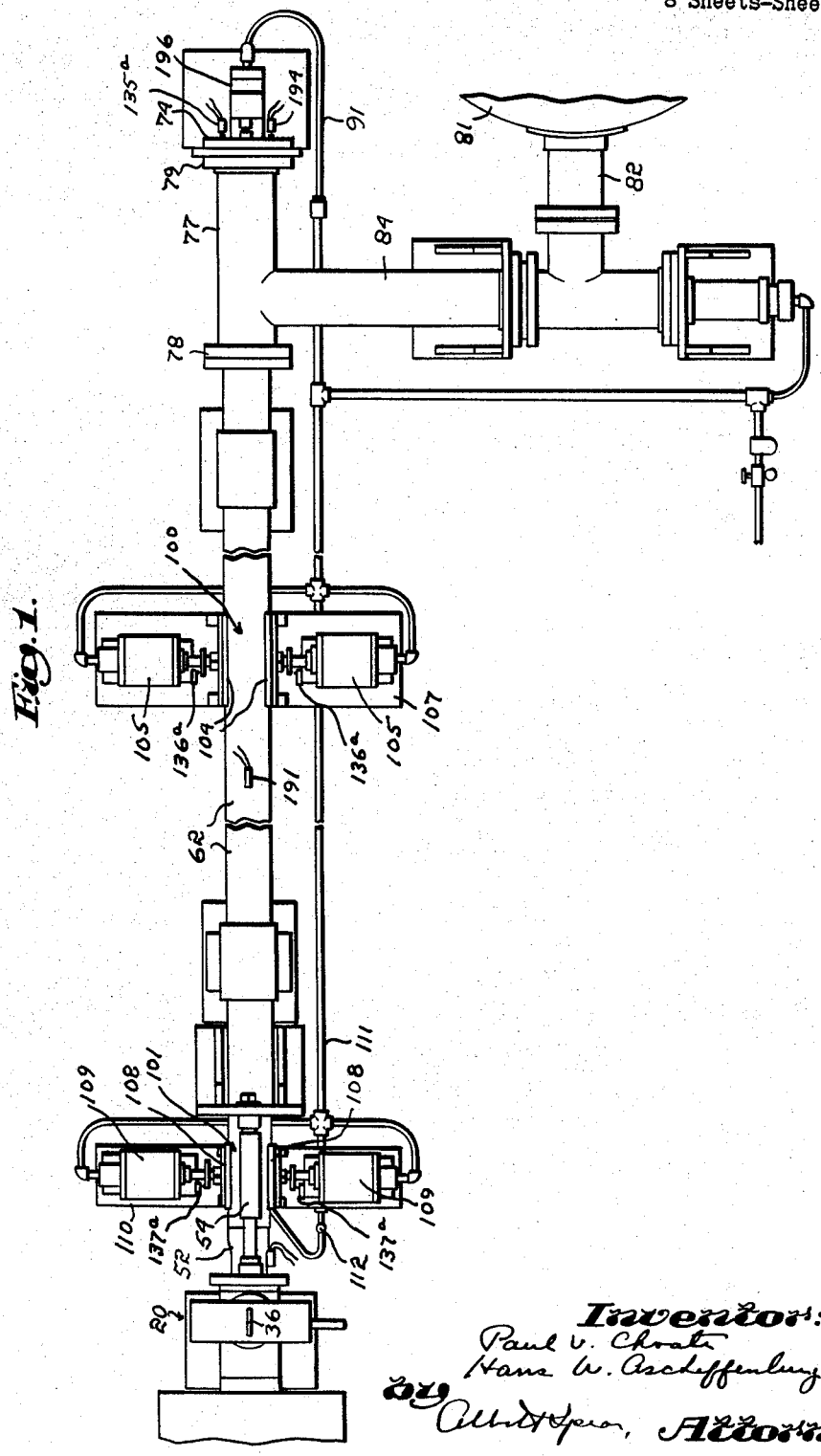

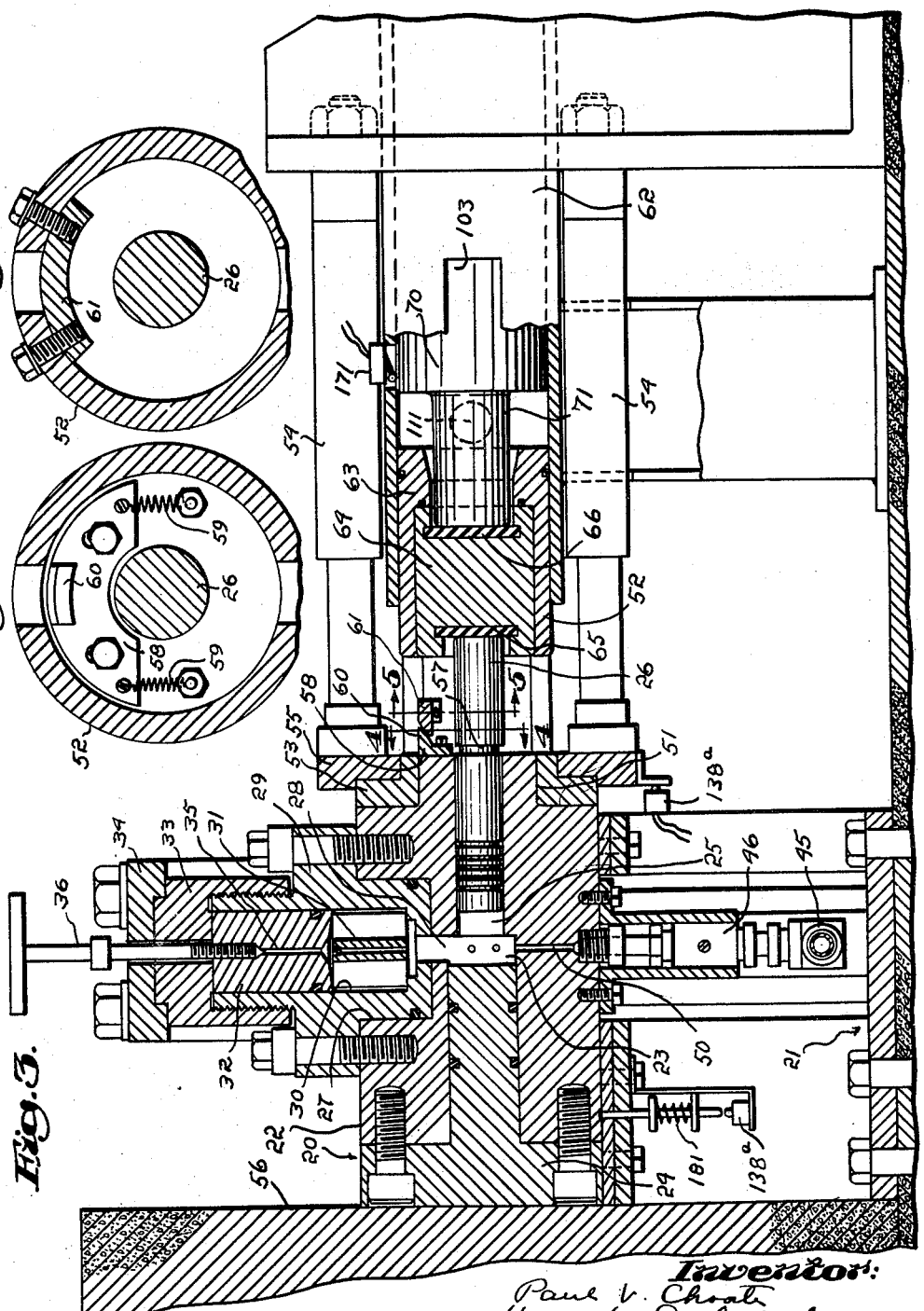

Oct. 25, 1960   P. V. CHOATE ET AL   2,957,337
HYDRODYNAMIC TESTING APPARATUS
Filed March 3, 1958   8 Sheets-Sheet 4
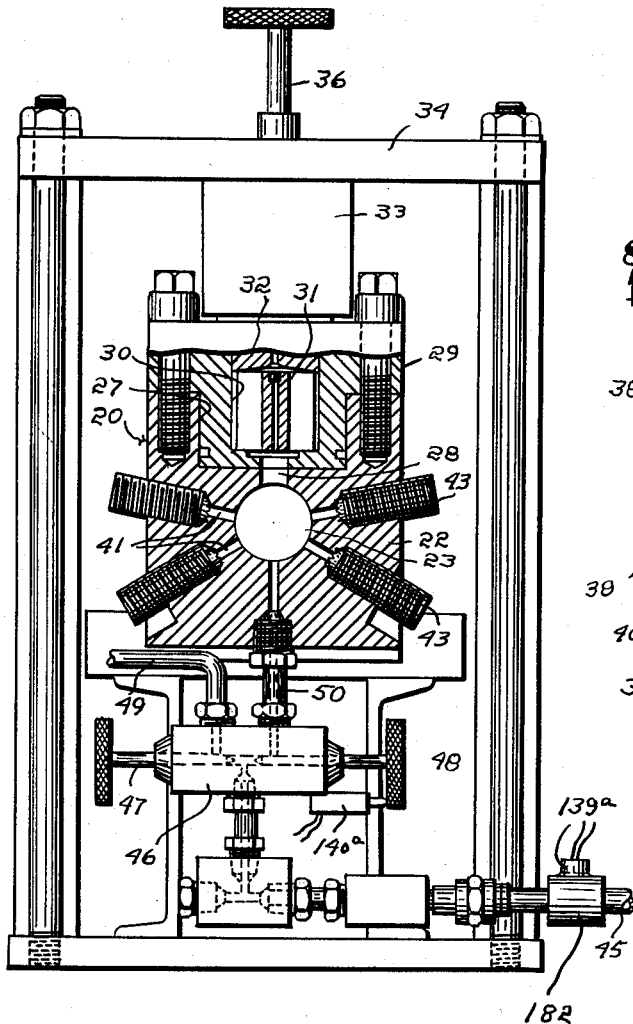
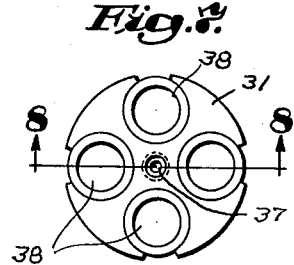
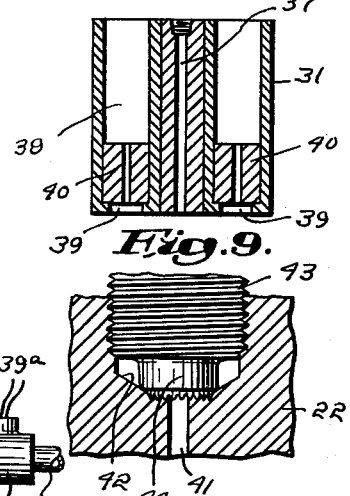

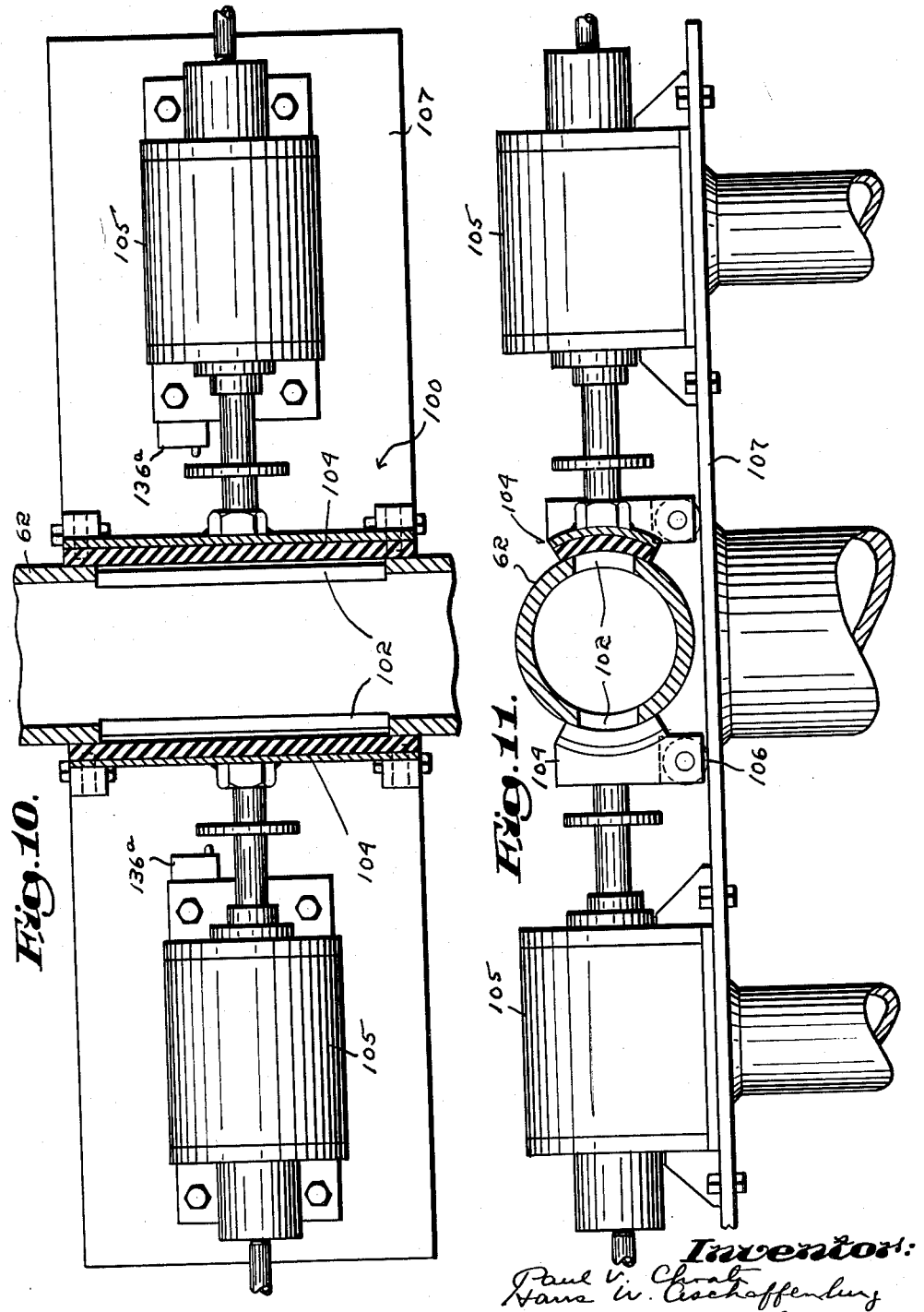

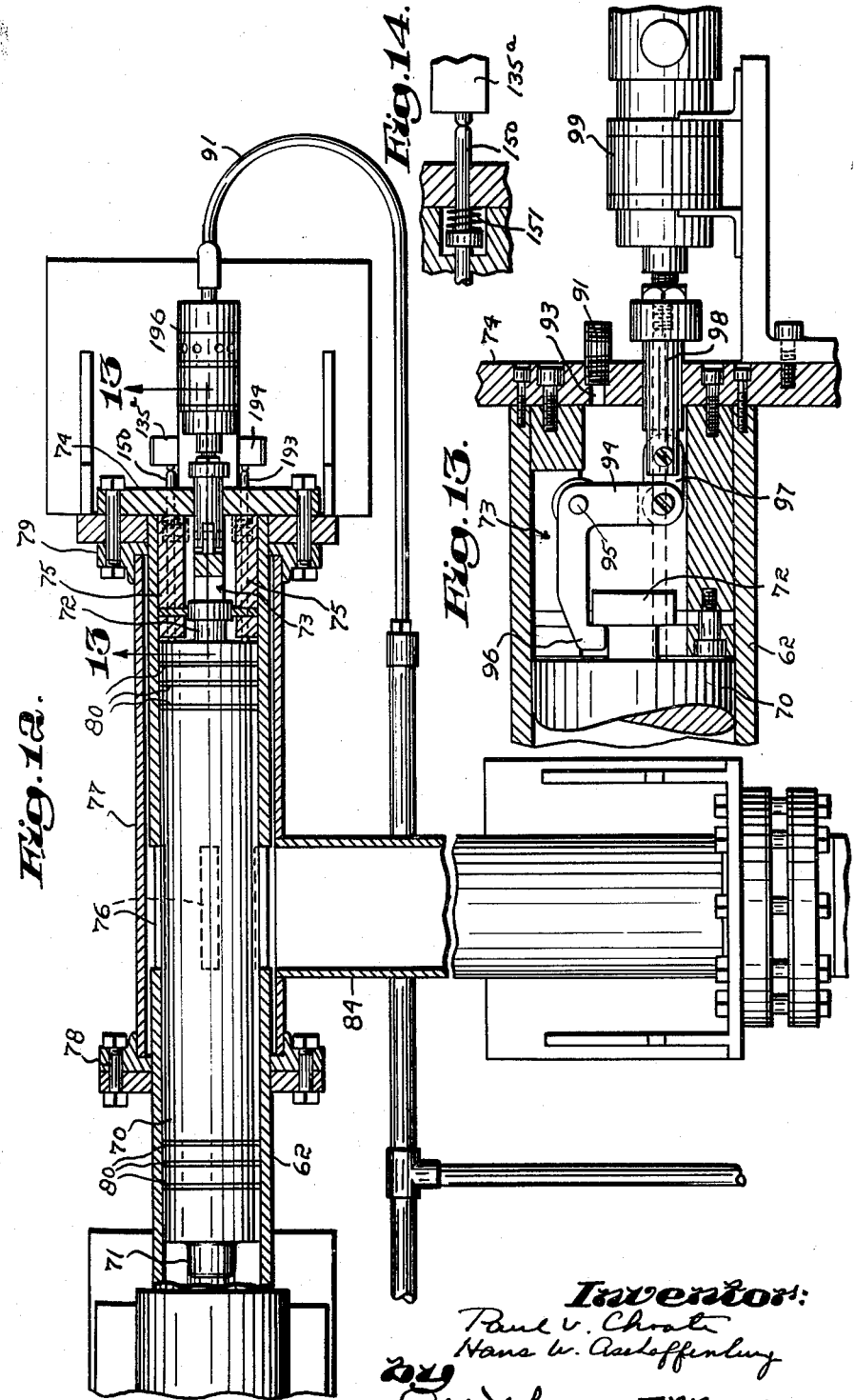

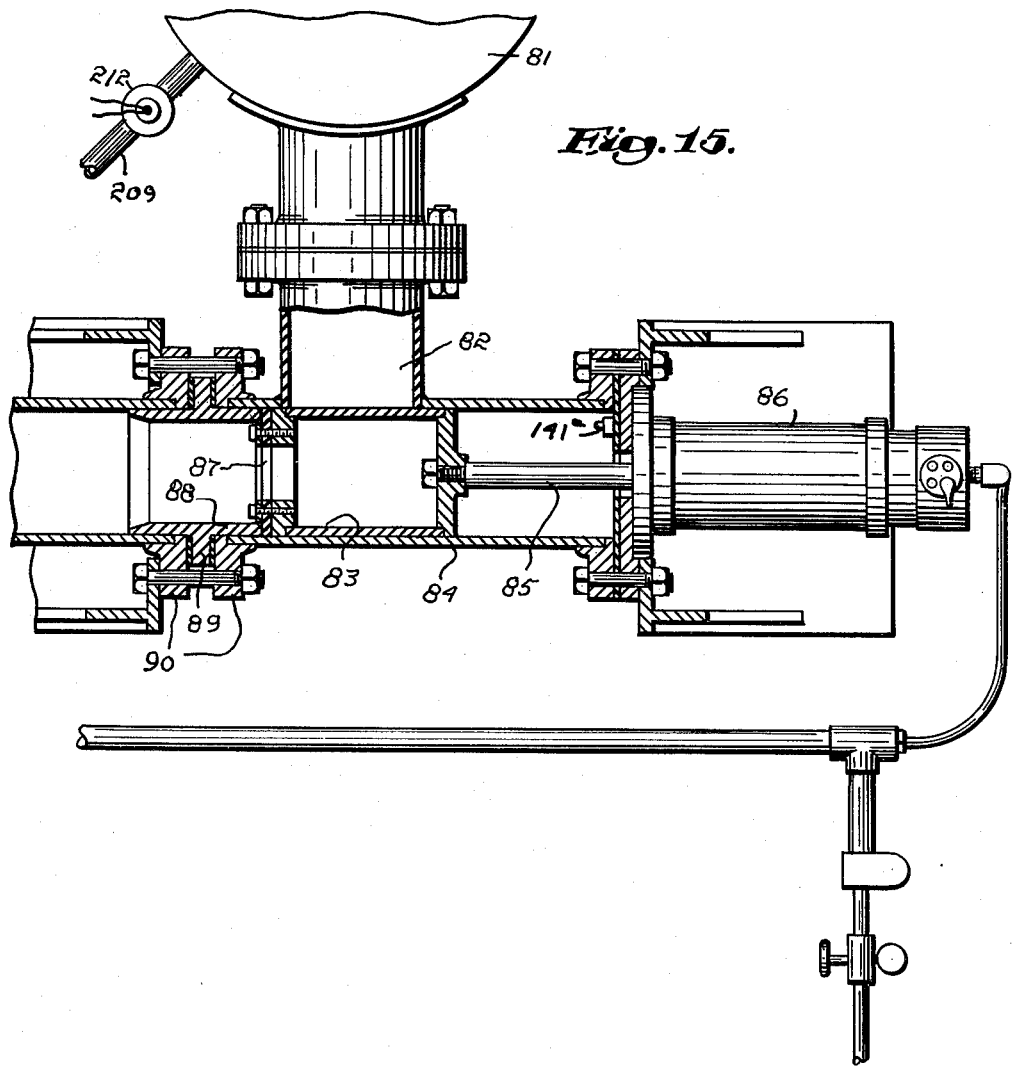

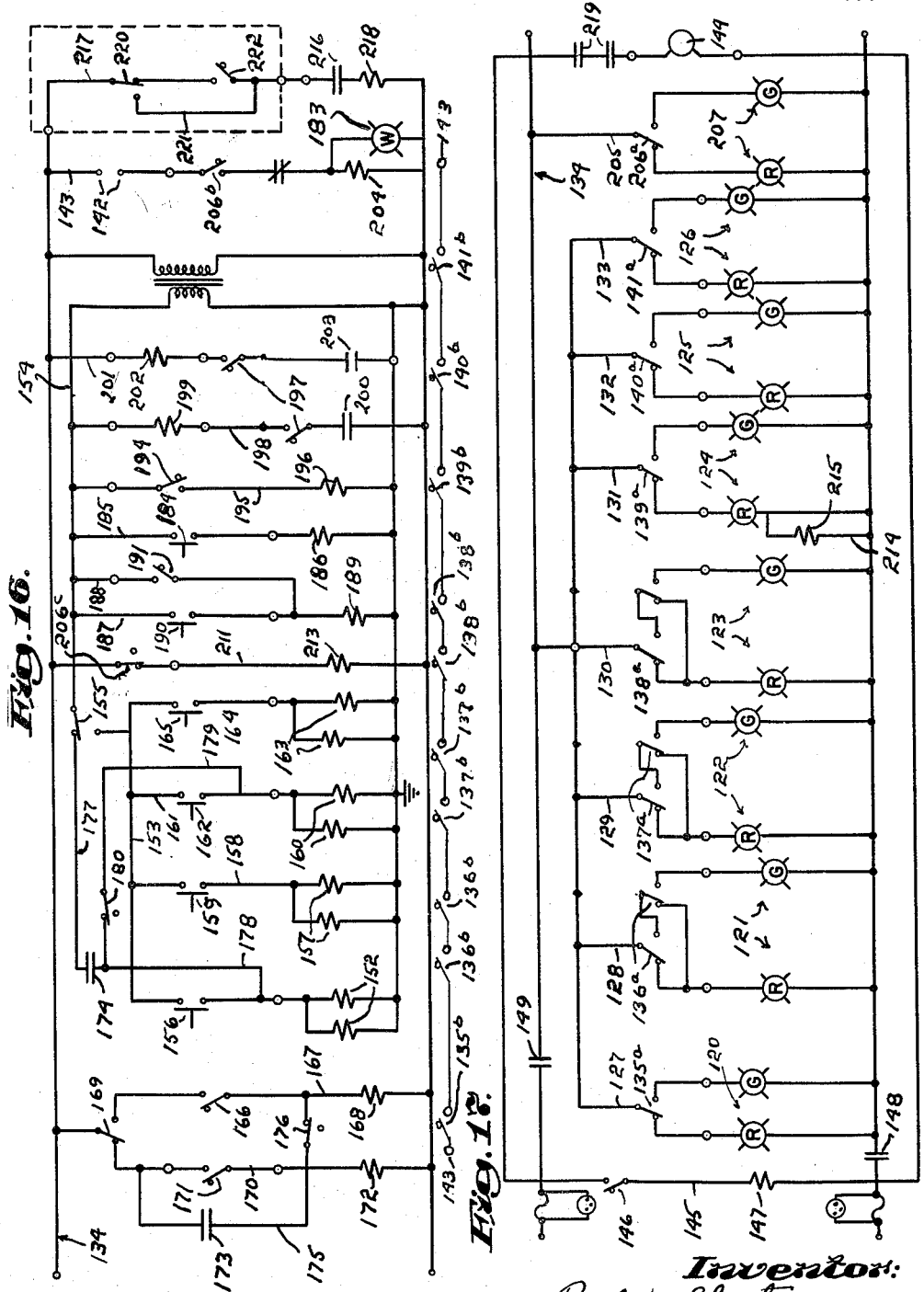

United States Patent Office 2,957,337
Patented Oct. 25, 1960

2,957,337

HYDRODYNAMIC TESTING APPARATUS

Paul V. Choate, Mattapan, and Hans W. Aschaffenburg, Concord, Mass., assignors to Flightex Fabrics, Inc., Providence, R.I., a corporation of Rhode Island Filed Mar. 3, 1958, Ser. No. 718,853

17 Claims. (Cl. 73—12)

The present invention relates to apparatus for use in testing hollow articles by means of pressures applied externally or internally thereof and generated by the impact of a slug on a liquid body with which the articles to be tested are in communication.

In the testing of hollow articles, it is important to know what pressures, either external or internal, they can withstand. Such testing frequently requires not only a knowledge of pressure in terms of pounds per square inch but also information as to rate of pressure application and duration. For that reason, it is desirable to test such articles by discharging a slug against piston means backed by a liquid body with which the article is in external or internal communication and which may be under substantial static pressure. Apparatus of that type is disclosed in the copending application of Andreas M. Koehler and Frank C. Hutchison, Serial No. 482,152, filed January 17, 1955.

It will be appreciated that, in testing with apparatus of the type referred to, accuracy requires precise control of all factors determining the generation and delivery of desired pressures, ease of operation and service, and, as the discharge of a slug in a test develops subtantial energy, safety controls ensuring against mishaps to equipment and personnel.

In accordance with the invention, there is provided a liquid chamber preferably provided with means adapting it for use in the testing of hollow articles by pressure applied externally or internally thereof. The pressure chamber has piston means disposed and arranged to be engaged by a slug projected along a barrel from a seat in its breech end as by means of air under pressure. The slug is also returned to the breech end of the barrel by air under pressure.

Where the generation of secondary pressure waves is to be avoided to a maximum extent, the piston means consist of a piston in the chamber having an end protruding therefrom and a transfer disc slidable axially in a sleeve, interconnecting the chamber and the barrel, between an annular stop, through which it is exposed to contact by the slug, and the proximate end of the chamber. In practice, the chamber is under pressure and the piston engages the disc and seats it against the stop and has cushions between it and the ends of the piston and slug engaging therewith. A lock is provided for the piston holding it against movement except when the sleeve is secured to the chamber.

The slug is seated in the breech end of the barrel in a position normally blocking the flow of propelling air from a reservoir when the main air valve is open. An air conduit is employed to admit air into the breech thus to advance the slug until it unblocks the propelling air and the valve in that air conduit is the one controlling the firing. In practice, a lock is employed to hold the slug in the breech and this is released whenever the "firing" valve is open.

The barrel is vented in two zones, one proximate the chamber and the other between it and the breech. A switch carried by the barrel is closed by the slug as it passes the intermediate vent zone and its closing effects closing of the main valve. The vents are closed by valves so that air introduced into the chamber end of the barrel will be effective to return the slug into its seated position in the breech end. Where automatic slug return is desired, a switch is carried by the barrel in a position to be closed by the slug when it reaches the chamber end thereof and its closing is attended by the opening of the valve in the return air conduit and the closing of the vent valves.

In practise, the "firing" is electrically effected and the firing circuit includes switches that are open unless existing conditions ensure safe and effective operation. For example, such conditions are that the chamber be in readiness, the sleeve be secured thereto, the barrel vents open, the slug seated and locked, the main valve open, and the operating pressures adequate. It is preferred that whether or not these or other desirable operations exist be indicated by green and red panel lights.

In the accompanying drawings, there is shown an illustrative embodiment of the invention from which and the ensuing description and discussion thereof, these and other of its objectives, novel features, and advantages will be readily apparent. In the drawings:

Fig. 1 is a top plan view of testing apparatus in accordance with the invention with the barrel broken away for convenience.

Fig. 2 is a side view of the apparatus.

Fig. 3 is a vertical section taken lengthwise of the pressure chamber assembly and of the proximate end of the barrel.

Figs. 4 and 5 are fragmentary sections taken approximately along the indicated lines 4—4 and 5—5, respectively, of Fig. 3.

Fig. 6 is a partial cross section taken vertically of the pressure chamber assembly.

Fig. 7 is an end view of a holder for a number of articles to be tested, particularly those to be tested by externally applied pressures.

Fig. 8 is a section taken along the indicated lines 8—8 of Fig. 7.

Fig. 9 is a fragmentary section, on an increased scale, showing one of the ports of the pressure chamber assembly used in testing an article by internally applied pressure.

Fig. 10 is a partly sectioned, plan view of the barrel in the zone of one set of vents and associated vent closing means.

Fig. 11 is a view of these parts taken axially of the barrel.

Fig. 12 is a partly sectioned plan view of the chamber end of the barrel.

Fig. 13 is a section, on an increased scale, taken approximately along the indicated lines 13—13 of Fig. 12.

Fig. 14 is a fragmentary and partly sectioned view of one of the control switches.

Fig. 15 is a fragmentary and partly sectioned plan view of the air pressure tank and the valve control therefor.

Fig. 16 is a schematic view of that part of the circuits controlling operation, and Fig. 17 is a like view of that part of the circuits that relate to panel lights.

In order that the invention may be most readily understood, reference is first made to Fig. 3 where the pressure chamber assembly, generally indicated at 20, is shown as comprising a base structure 21, a body 22 having a rearward bore 23 sealed by the plug 24 and a forward bore 25 in which the piston 26 is slidable. An upwardly disposed seat 27 has a port 28 in communication with the bore 23 and receives the member 29 having a ported chamber 30 in communication with the port 28 and dimensioned to receive a holder 31 for articles to be tested by pressures applied externally thereof. The member 29 is bolted in place and a plug 32 is held in the chamber 30 by a cap 33 threaded on the member 29 and securely retained by the header 34. The plug 32 has an axial bore 35 threaded to receive the valve 36 which the cap and header are apertured to accommodate. The center of the holder 31, see Figs. 7 and 8, has a bore 37 extending from end-to-end thereof and four compartments 38 each having a ported seat 39 for the article tested or, as shown, a ported closure 40.

In order that articles may be tested against internally applied pressures, the body 22 is provided, as may best be seen in Fig. 6, with a plurality of radial bores 41 each provided with a seat 42 threaded to receive a plug 43 by which a seal 44 is suitably compressed. When an article is to be tested against internally applied pressures, a plug 43 and seal 44 is removed and replaced by such an article.

A conduit 45 from a pump, not shown, of the type having a pressure responsive cut-off, leads to a block 46 for valves 47 and 48. The valve 47 controls the open line 49 while the valve 48 controls the passage 50 between the block 46 and the bore 23. After articles to be tested are in position, all spaces within the assembly 20 are filled with oil. It is preferred that this oil be free of entrapped air and be under substantial pressure, say 1000 pounds per square inch.

In practise, the delivery pump is first run with the valves 47 and 48 closed until it shuts itself off. The valve 47 is then open until the oil shows that it is substantially free of entrained air. The pump is then run with the valves 47 and 36 closed and the valve 48 open until the pressure at which the pump shuts itself off is attained. The valve 36 is then cracked open and oil escapes along its threads until its condition is satisfactory. The valves 36 and 48 are closed and the assembly 20 is ready.

The piston 26 extends axially through an annular seat 51 and is exposed within the sleeve 52 provided with an outwardly disposed flange 53 held against the seat 51 by hydraulic jacks 54 bearing against an interposed thrust ring 55, thus to anchor the assembly against the back stop 56. The piston 26 has an annual groove 57 adapted to be entered by a lock 58 mounted on the proximate end of the body 22, see Fig. 4, for sliding movement relative thereto. Springs 59 urge the lock 58 into its operative position. The lock 58 has a cam portion 60 and the sleeve 52 has a cam element 61 that coacts therewith to raise the lock into its inoperative position when the sleeve 52 is clamped in place. The sleeve 52 is entrant of the end of the barrel 62 and has an inturned flange 63 defining a stop for the transfer disc 64 which has cushion seats 65 and 66. It will be noted that the assembly 20 may be readied for use with the sleeve 52 detached as the lock 58 holds the piston 26 in position against the pressure thereon. When the sleeve 52 is secured, the lock 58 is released but the disc 64 backed by the stop 63 holds the piston 26 in position in engagement with the cushion seat 65.

Within the barrel 62 there is a slug 70 provided with a nose 71 and a rearwardly disposed headed stud 72. The nose 71 is dimensioned to engage the disc seat 66 through the opening established by the stop 63. The stud 72 is adapted to be engaged by the latch, generally indicated at 73, carried by the breech 74.

Reference is made to Fig. 12 wherein there are shown stops 75 engageable by the rear end of the slug 70 but spaced apart to accommodate the stud 72 between them. The stops 75 position the slug 70 so that circumferentially spaced ports 76 between the barrel and the chamber defined by the sleeve 77 that is sealed thereto at 78 and 79, are between its forward and rearward sets of seals 80.

A reservoir 81 of air under pressure, see Fig. 15, has a port 82 blocked by a valve 83 in a conduit 84 and attached to the stem 85 of the air motor 86 operable to move the valve 83 into either its open or closed positions.

The valve 83 has an annular seal 87 engageable with a seat 88 provided with a flange 89 clamped between the proximate end flanges 90 of two sections of the conduit 84. The conduit 84 opens into the chamber defined by the sleeve 77.

In operation, the slug 70 is not propelled against the shock absorbing disc 85 when the valve 83 is opened because, as above stated, the slug 70 blocks the flow of air from the reservoir 81 so long as it is seated against the stops 75. For that reason, an air conduit 91, provided with a valve 92, is connected to the port 93 in the breech 74. When the valve 92, which operates as a relief valve with respect to breech pressures, is open with respect to the barrel, the air pressure on the rear end of the slug 70 is sufficient to unseat it to an extent permitting air to enter in back of it via the ports 76, under the pressure of the reservoir. As a consequence, the slug 70 is fired at the desired velocity.

The latch 73 is provided as a safety measure against accidental discharge and its details may best be seen in Fig. 13. A bell crank 94 is pivoted at 95 within the barrel 63 and its free end terminates in a stud-engaging shoulder 96. Its other end is pivotally connected to a link 97 pivoted to the stem 98, slidable in the breech 74, of an air motor 99 operable to slide the stem in either direction and operated by means subsequently to be detailed. It will be understood that when the latch 73 is in its position shown in Fig. 13, the slug cannot be moved. The latch is released when the stem slides forwardly, to the left, as viewed in the drawings.

The barrel 62 is vented at axially spaced zones indicated generally at 100 and 101. The venting, in each instance, is accomplished by means of a pair of ports. The ports in the zone 100 being indicated at 102 and those in the zone 101 being indicated at 103. In practise, each of the ports 102 is larger than the ports 103 and is adapted to be closed by a valve 104 moved into and out of port closing position by an air motor 105. Each valve 104 is supported by a roller 106 in engagement with the support 107 on which the air motors are mounted. Each of the ports 103 in the zone 101 is adapted to be opened and closed by a similar valve 108 whose actuating air motor is indicated at 109 and which is mounted on the support 110.

A conduit 111 for air under pressure is placed in communication with the forward end of the barrel 62 and is under the control of a valve 112 so that after the slug 70 has been fired, it may be returned to the breech end by closing the air vents in the zones 100 and 101 and opening the air valve 112. The air conduit 111 also supplies air under pressure to the air motors 105 and 109.

For the purposes of explaining the operation of the apparatus, its controls, and safeguards ensuring operation only when standards of safety have been met, it will be assumed that the slug 70 is in the breech end of the barrel 62 but is not seated against the stops 75.

In Fig. 17, there are shown a plurality of pairs of lights of which one is red and the other green. These pairs are indicated at 120, 121, 122, 123, 124, 125 and 126 and are arranged in parallel leads 127, 128, 129, 130, 131, 132, and 133, respectively, connected to the circuit 134 and provided with switches 135$^a$, 136$^a$, 137$^a$, 138$^a$, 139$^a$, 140$^a$, and 141$^a$, respectively, that are each a part of a double pole, double throw type of switch. The other parts of these switches are located in series between the contacts 142 of the lead 143 and are indicated at 135$^b$, 136$^b$, 137$^b$, 138$^b$, 139$^b$, 140$^b$, and 141$^b$, respectively. The switches 135$^a$, 136$^a$, 137$^a$, 138$^a$, 139$^a$, 140$^a$, and 141$^a$ are normally positioned to close the circuit to the red light of the associated pair of lights.

The pump motor 144 is in a circuit 145 provided with a switch 146 that may be key operated and including the coil 147 closing, when energized, the contacts 148 and 149 of the circuit 134.

The indications of the red light of each of the above pairs of lights may be most readily appreciated by assuming that each red light is in circuit. The pairs of lights 120 indicate whether or not the slug 70 is seated against its stops 75. As may be seen in Figs. 12 and 14, a plunger 150 extends through the breech 74 and one of the stops 75 and is urged forwardly by the spring 151. When the slug 70 seats, it pushes the plunger 150 to position the switch 135a to close the circuit to the green light of the associated pair of lights 120 and to close the switch 135b.

Under the assumed conditions, the slug 70 is not seated and in order that it may be seated by air delivered to the end of the barrel 62 proximate the housing 20, the vents must be closed. The pair of lights 121 indicate whether the larger vents 102 are open or closed and a like indication is given by the pair of lights 122 for the smaller pair of vents 103. There is a switch 136a for each vent closing valve 104 adapted to be positioned thereby, when open, to place the green light of the pair 121 in circuit. Similarly, there is a switch 137a for each vent closing valve 108 adapted to be positioned by the opening thereof to place the green light of the pair 123 in circuit.

The air motors 105 have their closing coils 152 arranged in parallel in a lead 153 connected to the lead 154 by a switch 155 and having a normally open push button switch 156. The air motors 105 have their opening coils 157 arranged in parallel in a lead 158 connected to the lead 153 and also provided with a normally open push button switch 159.

The air motors 109 have their closing coils 160 in parallel in a lead 161 connected to the lead 153 and provided with a normally open push button switch 162 and their closing coils 163 arranged in parallel in a lead 164 from the lead 153 and provided with a normally open push button switch 165.

By these means, the vents in both zones 100 and 101 may be closed or opened. When the vents are closed, the red light of the associated pair of lights is placed in circuit and when they are open, the green lights are on and the switches 136b and 137b are closed.

When the vents are all closed, the valve 112 may be opened to seat the slug 70 by closing the switch 166 in the lead 167 including the operating coil 168 for the valve 112 thus to urge the slug 70 towards the breech until it seats, with the seating being indicated by the green light of the pair 120.

In accordance with the invention, it is also provided that the return of the slug 70 may be automatically effected. For this purpose, the lead 167 has a switch 169 adapted to substitute a parallel lead 170 in the circuit. The parallel lead 170 has a normally open switch 171 carried by the barrel 62 to be closed by the slug 70 approximately at the end of its travel and the coil 172 by which contacts 173 and 174 are closed. The contact 173 closes the lead 175 to the coil 168 and also has a switch 176 open when manual operation is wanted.

The contacts 174 are in a lead 177 closed by the switch 155 when automatic operation is desired and including branches 178 and 179 to the leads 153 and 161, respectively, and by-passing the push button switches thereof. The branch 179 has a switch 180 that is closed when automatic operation is wanted. It will be appreciated that, in practise, the switches 169, 176, 155, and 180 are moved as a unit in shifting between manual and automatic operation.

Green lights now indicate that the slug is seated so that the ports 102 and 103 are now opened by means of the manually operated switches 159 and 165 with green lights of the pairs 121 and 122 now being in circuit to indicate that fact.

It is also necessary that the pressure chamber 20 be prepared for the test. This requires that the parts be in position thus to close one of the switches 138a by means of the spring-backed stem 181 and that the sleeve 52 be securely clamped to the housing 20 to close the other of the switches 138a, both closings being with respect to the green light of the pair 123 and being attended by the closing of the switches 137b.

For a proper test, it is also necessary that the chamber 20 be under a predetermined pressure and for that reason the pressure supply conduit 45 is provided with the switch 139a in a unit 182 by which it is actuated by the conduit pressure to close the lead 131 with respect to the green light of the pair of lights 124. It is also necessary to ensure that the valve 48 be closed during a test and the switch 140a is actuated by the closing thereof to place the green light of the pair 125 in the lead 122 in circuit.

The main valve 83, when opened, positions the switch 141a to close the lead 133 to the green light of the pair 126 and the switch 141b so that now all the switches are closed between the contacts 142 so that a white light 183 is illuminated as are all the green lights. The apparatus is now in readiness to be fired if the air pressure is adequate.

The main valve 83 is opened by the manual closing of the switch 184 in the lead 185 to the opening coil 186 of the air motor 86 and is closed either manually or automatically. To accomplish this control of the valve 84, there are parallel leads 187 and 188 both connected to the closing coil 187 of the air motor 86. The lead 187 has a normally open, manually closed switch 190, while the lead 188 has a switch 191 carried by the barrel 62 to be closed by the slug 70 as it clears the ports 102.

It will be noted from Fig. 12, that when the slug 70 is seated, it actuates the spring-backed push rod 193 to close the switch 194 in the lead 195 of the lead 154 to the locking coil 196 of the air motor 196 of the latch 73.

Assuming that the air pressure in the reservoir 81 is adequate, the apparatus may be fired by closing the push button switch 197 in the lead 198 of the lead 154 including the unlocking coil 199 of the latch operating air motor 196 provided that its contacts 200 are closed. A second lead 201 of the circuit 136 is also closed by the switch 197 after the coil 199 has been energized and the lead 201 includes the coil 202 for opening the valve 92 thus to unseat the slug 70. The lead 201 also has contacts 203 and these and the contacts 200 are closed when the coil 204 in the lead 143 in parallel with the white light 183 is energized when all green lights are in circuit.

It is essential that adequate air pressure is available to ensure that the firing of the slug will be attended by the generation of pressures of the magnitude wanted for the test, 50,000 pounds per square inch or more, for example.

For that reason, there is provided a lead 205 having a switch 206a adapted to light the green or red light of the pair 207 in the alternative. The switch 206a is one part of a triple pole, double throw switch whose part 206b is in the lead 143. The switch 206a is manually set by the operator depending on whether or not the pressure gauge of the reservoir 81 shows adequate pressure. The green light of the pair 207 is placed in the circuit when the pressure is satisfactory. If the pressure is to be increased, the switch part 206c in the lead 211 is closed to control the opening coil 213 of the valve 212 enabling desired reservoir pressures to be established. The switches 206a, 206b, 206c are then moved as a unit to close the valve 212 to establish green light conditions. This operation is performed after the main valve 83 has been opened.

If the pressure in the chamber 20 is inadequate, the red light of the pair 124 is in circuit as is a parallel lead 214 including the coil 215 closing the contacts 216 in the lead 217 whereby the coil 218 of the contacts 219 are closed in the circuit to the motor 144. The lead 217 has a switch 220 which usually is positioned to close a lead 221 to by-pass the switch 222 to provide automatic operation. In the other position of the switch 220 as shown in the drawings, the switch 222 is to be operated manually.

What we therefore claim and desire to secure by Letters Patent is:

1. In apparatus for approximately instantaneously generating hydraulic pressures of high value for testing hollow articles, a liquid pressure chamber including means for holding an article in communication therewith, a barrel provided with a seat in its breech end, a slug in said barrel, valve controlled air pressure discharge means in communication with said barrel in the zone of said seat and operative to propel said slug to the other end of said barrel, a sleeve interconnecting said barrel and said chamber and provided with an annular stop, and piston means including a transfer disc slidably confined by said sleeve between said stop and said chamber and engageable through said stop by said slug, and a piston disposed in said chamber with an end exposed for engagement with said disc.

2. The apparatus of claim 1 in which the slug has a nose and the transfer disc has end cushions, one engageable by the nose and the other by the exposed piston end.

3. In apparatus for approximately instantaneously generating hydraulic pressures of high value for testing hollow articles, a liquid pressure chamber including means for holding an article in communication therewith, a barrel provided with a seat in its breech end, a slug in said barrel, an air pressure discharge means in communication with said barrel in the zone of said seat and operative to propel said slug to the other end of said barrel, said discharge means including a control, a sleeve interconnecting said barrel and said chamber and provided with an annular stop, and piston means including a transfer disc slidably confined by said sleeve between said stop and said chamber and engageable through said stop by said slug, a piston disposed in said chamber with an end exposed for engagement with said disc, said chamber and said sleeve constituting the impact end of said apparatus and electrically operated means to actuate said control and including a circuit provided with a normally open switch located at said impact end and closed when said sleeve and said chamber are interconnected and said impact end is in a condition to be safely operated.

4. In apparatus for approximately instantaneously generating hydraulic pressures of high value for testing hollow articles, a liquid pressure chamber including means for holding an article in communication therewith, means for delivering a liquid thereto under a predetermined pressure, said delivering means including a normally open pressure responsive switch closed by the chamber pressure when it reaches a predetermined value, and a normally open switch, a barrel provided with a seat in its breech end, a slug in said barrel, an air pressure discharge means in communication with said barrel in the zone of said seat and operative to propel said slug to the other end of said barrel, said discharge means including a control, a sleeve interconnecting said barrel and said chamber and provided with an annular stop, and piston means including a transfer disc slidably confined by said sleeve between said stop and said chamber and engageable through said stop by said slug, a piston disposed in said chamber with an end exposed for engagement with said disc, and electrically operated means to actuate said control and including a circuit inclusive of said pressure responsive switch.

5. In apparatus for approximately instantaneously generating hydraulic pressures of high value for testing hollow articles, a liquid pressure chamber including means for holding an article in communication therewith, fixed and movable parts having a predetermined relationship when the chamber is in condition for a test, and a normally open switch closed when said parts are in said predetermined relationship, a barrel provided with a seat in its breech end, a slug in said barrel, an air pressure discharge means in communication with said barrel in the zone of said seat and operative to propel said slug to the other end of said barrel, said discharge means including a control, a sleeve interconnecting said barrel and said chamber and provided with an annular stop, and piston means including a transfer disc slidably confined by said sleeve between said stop and said chamber and engageable through said stop by said slug and a piston disposed in said chamber with an end exposed for engagement with said disc, and electrically operated means to actuate said control and including a circuit inclusive of said switch.

6. In apparatus for approximately instantaneously generating hydraulic presures of high value for testing hollow articles, a liquid pressure chamber including means for holding an article in communication therewith, a barrel provided with a seat in its breech end, a slug in said barrel, valve controlled air pressure discharge means in communication with said barrel in the zone of said seat and operative to propel said slug to the other end of said barrel, a sleeve interconnecting said barrel and said chamber and provided with an annular stop, said sleeve being clamped to said chamber, piston means including a transfer disc slidably confined by said sleeve between said stop and said chamber and engageable through said stop by said slug, and a piston disposed in said chamber with an end exposed for engagement with said disc, a yieldable piston lock carried by said chamber, and means carried by said sleeve disengaging said lock from said sleeve when said sleeve is clamped to said chamber.

7. In apparatus for approximately instantaneously generating hydraulic pressures of high value for testing hollow articles, a liquid pressure chamber including means for holding an article in communication therewith and piston means, a barrel provided with a seat in its breech end, said piston means being exposed in the other end of said barrel, a slug in said barrel, an air pressure discharge means in communication with said barrel in the zone of said seat and operative to propel said slug against said exposed end, said discharge means including a conduit for propelling air opening into said barrel but blocked by said slug when in engagement with said seat, a conduit opening through said breech for air under pressure adequate to move said slug into a position unblocking said first named conduit, and electrically operated valve means in control of said second named conduit, and a lock in said breech locking said slug against said seat and including electrically operated locking and unlocking means operable to engage said lock when said slug is in engagement with said seat, and electrically operated means for said lock and said valve means, said electrically operated means including a first position in which said lock is disengaged and a second position in which said second named conduit is also open.

8. In apparatus for approximately instantaneously generating hydraulic pressures of high value for testing hollow articles, a liquid pressure chamber including means for holding an article in communication therewith and piston means, a barrel provided with a seat in its breech end, said piston means being exposed in the other end of said barrel, a slug in said barrel, an air pressure discharge means in communication with said barrel in the zone of said seat and operative to propel said slug against said exposed end, said discharge means including a conduit for propelling air opening with said barrel but blocked by said slug when in engagement with said seat and electrically operated valve means for opening said conduit, a conduit opening through said breech for air under pressure adequate to move said slug into a position unblocking said first named conduit and electrically operated valve means in control of said second named conduit and a lock in said breech locking said slug against said seat and including electrically operated locking and unlocking operable to engage said lock when said slug is in engagement with said seat, electrically operated means for said lock and second named valve means including a first position in which said lock is disengaged and a second position in which said second named conduit is open, and a switch closed when said first named valve means is open.

9. In apparatus for approximately instantaneously generating hydraulic pressures of high value for testing hollow articles, a liquid pressure chamber including means for holding an article in communication therewith and piston means, a barrel provided with a seat in its breech end, said piston means being exposed in the other end of said barrel, a slug in said barrel, an air pressure discharge means in communication with said barrel in the zone of said seat and operative to propel said slug against said exposed end, and including an electrically operated control valve and a normally open circuit thereto, said barrel having two axially spaced vents, one adjacent said other barrel end and one between it and said seat, electrically operated valve means for said vents, one for each vent, and including circuits for effecting the open and closed position of said valve means relative to said vents, the closing circuit being provided with a switch carried by said barrel to be actuated by said slug as it passes the vent adjacent said other barrel end, a control circuit including switches, one for each of said valve means and closed by the opening thereof, and a relay to close the circuit to the control valve of said discharge means.

10. In apparatus for approximately instantaneously generating hydraulic pressures of high value for testing hollow articles, a liquid pressure chamber including means for holding an article in communication therewith and piston means, a barrel provided with a seat in its breech end, said piston means being exposed in the other end of said barrel, a slug in said barrel, and air pressure discharge means in communication with said barrel in the zone of said seat and operative to propel said slug against said exposed end, air delivering means in communication with said barrel at the chamber end thereof, air pressure return means in communication with said other barrel end and including an electrically operated control valve and a normally open circuit thereto, said barrel having two axially spaced vents, one adjacent said other barrel end and one between it and said seat, electrically operated valve means for said vents, one for each vent, and including circuits for effecting the open and closed position of said valve means relative to said vents, the closing circuit being provided with a switch carried by said barrel to be actuated by said slug as it passes the vent adjacent said other barrel end, the circuit to the control valve of said return means including switches, one for each of said valve means and closed by the closing thereof.

11. In apparatus for approximately instantaneously generating hydraulic pressures of high value for testing hollow articles, a liquid pressure chamber including means for holding an article in communication therewith and piston means, a barrel provided with a seat in its breech end, said piston means being exposed in the other end of said barrel, a slug in said barrel, an air pressure discharge means in communication with said barrel in the zone of said seat and operative to propel said slug against said exposed end, said discharge means including an electrically operated control valve, and a normally open circuit thereto, air pressure return means in communication with said other barrel end and including an electrically operated control valve and a normally open circuit thereto, said barrel having two axially spaced vents, one adjacent said other barrel end and one between it and said seat, electrically operated valve means for said vents, one for each vent, and including circuits for effecting the open and closed position of said valve means relative to said vents, the closing circuit being provided with a switch carried by said barrel to be actuated by said slug as it passes the vent adjacent said other barrel end, a control circuit including switches, one for each of said valve means and closed by the opening thereof, and a relay to close the circuit to the control valve of said discharge means, the circuit to the control valve of said return means including switches, one for each of said valve means and closed by the closing thereof.

12. In apparatus for approximately instantaneously generating hydraulic pressures of high value for testing hollow articles, a liquid pressure chamber including a valve controlled inlet for liquid under pressure in communication with said chamber, a valve controlled chamber outlet means for holding an article in communication therewith, a barrel provided with a seat in its breech end, a slug in said barrel, air pressure discharge means in communication with said barrel in the zone of said seat and operative to propel said slug to the other end of said barrel, said discharge means including a control and piston means disposed in said chamber with an end exposed for engagement by said slug and electrically operated means for said control including a switch closed when said chamber is under desired pressure.

13. The apparatus of claim 12 in which the article holding means comprise a compartment for articles and provided with sealed ports each adapted to receive a hollow article with its interior in communication with the compartment.

14. In apparatus for approximately instantaneously generating hydraulic pressures of high value for testing hollow articles, a liquid pressure chamber including a valve controlled inlet for liquid under pressure, a valve controlled chamber outlet, means for holding an article in communication with said chamber between said inlet and said outlet, impact means including an impact delivering slug, and piston means disposed in said chamber with an end exposed for engagement by said slug.

15. In apparatus for approximately instantaneously generating hydraulic pressures of high value for testing hollow articles, a liquid pressure chamber including means for holding an article in communication therewith and piston means, a barrel provided with a seat in its breech ends, said piston means being exposed in the other end of said barrel, a slug in said barrel, valve controlled air pressure discharge means in communication with said barrel in the zone of said seat and operative to propel said slug against said exposed end, and electrically operated control means including a series of signals including switches operatively associated with said barrel and said chamber, and a series of operating controls including a firing control circuit for said air discharge means in which said switches are arranged in series.

16. In apparatus for approximately instantaneously generating hydraulic pressures of high value for testing hollow articles, a liquid pressure chamber including means for holding an article in communication therewith and piston means, a barrel provided with a seat in its breech end, said piston means being exposed in the other end of said barrel, a slug in said barrel, a reservoir for air under pressure, including a valve controlled air pressure dischage means in communication with said reservoir and said barrel in the zone of said seat and operative to propel said slug against said exposed end, valve controlled air pressure means in communication with the chamber end of said barrel, and electrically operated control means including a series of signals including switches operatively associated with said barrel, said chamber, and said reservoir, and a series of operating controls including a firing control circuit for said air discharge means in which said switches and said reservoir valve are arranged in series.

17. In apparatus for approximately instantaneously generating hydraulic pressures of high value for testing hollow articles, a liquid pressure chamber including means for holding an article in communication therewith and piston means, a barrel provided with a seat in its breech end, said piston means being exposed in the other end of said barrel, a slug in said barrel, valve controlled air pressure discharge means in communication with said barrel in the zone of said seat and operative to propel said slug against said exposed end, valve controlled air pressure slug return means in communication with the chamber end of said barrel, a firing control circuit for said air discharge means, and a return control for said return means including a switch exposed in said barrel to be closed by said slug.

References Cited in the file of this patent
UNITED STATES PATENTS

| | | |
|---|---|---|
| 2,341,270 | Deam et al. | Feb. 8, 1944 |
| 2,474,235 | Dresser et al. | June 28, 1949 |
| 2,604,777 | Armstrong et al. | July 29, 1952 |
| 2,610,504 | Nigh | Sept. 16, 1952 |
| 2,743,604 | Stein et al. | May 1, 1956 |
| 2,810,288 | Herron et al. | Oct. 22, 1957 |